US012598656B2

(12) United States Patent
Zhu et al.

(10) Patent No.: US 12,598,656 B2
(45) Date of Patent: Apr. 7, 2026

(54) METHOD FOR EDGE COMPUTING

(71) Applicant: ZTE CORPORATION, Shenzhen (CN)

(72) Inventors: Jinguo Zhu, Shenzhen (CN); Lijuan Chen, Shenzhen (CN); Qiang Huang, Shenzhen (CN); Qiang Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 91 days.

(21) Appl. No.: 18/713,981

(22) PCT Filed: Feb. 18, 2022

(86) PCT No.: PCT/CN2022/076869
§ 371 (c)(1),
(2) Date: May 28, 2024

(87) PCT Pub. No.: WO2023/155145
PCT Pub. Date: Aug. 24, 2023

(65) Prior Publication Data
US 2025/0048459 A1      Feb. 6, 2025

(51) Int. Cl.
*G06F 15/16*          (2006.01)
*G06F 9/54*           (2006.01)
(Continued)

(52) U.S. Cl.
CPC ....... *H04W 76/12* (2018.02); *H04W 28/0215* (2013.01); *H04W 28/0226* (2013.01); *H04W 76/32* (2018.02)

(58) Field of Classification Search
CPC ............. H04W 76/12; H04W 28/0215; H04W 28/0226; H04W 76/32; H04W 88/14; H04L 67/141; H04L 67/55
(Continued)

(56) References Cited

U.S. PATENT DOCUMENTS 8,230,074 B2 *   7/2012   Lindgren ............ H04L 65/1104
                                              709/227
10,298,582 B2 *   5/2019   Syomichev ........... H04L 67/561
(Continued)

FOREIGN PATENT DOCUMENTS

AU        2021209155 A1 *   8/2021   .......... H04L 41/042
CN        103428888 A       12/2013
(Continued)

OTHER PUBLICATIONS

International Search Report in Application No. PCT/CN2022/076869, dated Nov. 1, 2022, 2 pages.
(Continued)

*Primary Examiner* — Hamza N Algibhah
(74) *Attorney, Agent, or Firm* — Morgan, Lewis & Bockius LLP

(57) ABSTRACT
Method, device and computer program product for wireless communication are provided. A method includes: transmitting, by an application function to a first application server, a tunnel ready notification to allow the first application server to transfer an application layer traffic to a second application server via a tunnel between a first local user plane function for the first application server and a second local user plane function for the second application server.

15 Claims, 7 Drawing Sheets

(51) Int. Cl.
H04L 29/06 (2006.01)
H04W 28/02 (2009.01)
H04W 76/12 (2018.01)
H04W 76/32 (2018.01)

(58) Field of Classification Search
USPC ........................................... 726/23; 709/228
See application file for complete search history.

(56) References Cited

U.S. PATENT DOCUMENTS

| | | | | | |
|---|---|---|---|---|---|
| 10,841,974 | B1 * | 11/2020 | Young | ................... | H04W 76/30 |
| 11,659,451 | B2 * | 5/2023 | Zhu | ................... | H04W 36/0011 |
| | | | | | 370/331 |
| 11,856,632 | B2 * | 12/2023 | Li | ......................... | H04W 76/12 |
| 12,256,466 | B2 * | 3/2025 | Puente | .................... | H04L 67/14 |
| 2008/0008185 | A1 | 1/2008 | Lindgren et al. | | |
| 2019/0141763 | A1 | 5/2019 | Xu et al. | | |
| 2019/0306251 | A1 * | 10/2019 | Talebi Fard | .......... | H04W 76/10 |
| 2020/0323029 | A1 * | 10/2020 | Lu | ......................... | H04W 76/25 |
| 2021/0144590 | A1 * | 5/2021 | Li | ......................... | H04W 76/36 |
| 2022/0109633 | A1 * | 4/2022 | Li | ......................... | H04W 48/08 |
| 2022/0174038 | A1 * | 6/2022 | Yu | ......................... | H04L 45/74 |
| 2022/0256422 | A1 * | 8/2022 | Condoluci | ............. | H04W 4/50 |
| 2022/0330128 | A1 * | 10/2022 | Kim | ........................ | H04W 4/50 |
| 2023/0353997 | A1 * | 11/2023 | Featherstone | ....... | H04L 41/5096 |
| 2024/0137422 | A1 * | 4/2024 | Xu | ........................ | H04L 67/148 |
| 2025/0070999 | A1 * | 2/2025 | Li | ......................... | H04L 45/00 |

FOREIGN PATENT DOCUMENTS

| | | | | | | |
|---|---|---|---|---|---|---|
| CN | 110650513 | A | * | 1/2020 | ............ | H04W 76/22 |
| CN | 111225070 | A | | 6/2020 | | |
| CN | 111314464 | A | | 6/2020 | | |
| CN | 111373774 | A | * | 7/2020 | .......... | H04L 12/189 |
| CN | 112654070 | A | * | 4/2021 | ............ | H04W 76/16 |
| CN | 112806056 | A | * | 5/2021 | ............ | H04L 45/22 |
| CN | 111314464 | B | * | 6/2021 | ............ | H04L 67/146 |
| CN | 112911661 | A | * | 6/2021 | .......... | H04W 36/087 |
| CN | 113473569 | A | * | 10/2021 | ............ | H04W 48/04 |
| CN | 114040450 | A | * | 2/2022 | ............ | H04W 28/10 |
| CN | 114731557 | A | * | 7/2022 | ............ | H04L 45/655 |
| CN | 114980223 | A | * | 8/2022 | ............ | H04W 36/00 |
| CN | 115190169 | A | * | 10/2022 | ........ | H04L 67/1023 |
| CN | 116998198 | A | * | 11/2023 | .......... | H04L 67/148 |
| EP | 4057697 | A1 | * | 9/2022 | .......... | H04L 45/655 |
| KR | 20210144491 | A | * | 11/2021 | ............ | H04W 80/10 |
| RU | 2785332 | C2 | * | 12/2022 | | |
| WO | WO-2018006359 | A1 | * | 1/2018 | ............ | H04W 88/16 |
| WO | WO-2018153478 | A1 | * | 8/2018 | ............ | H04W 76/12 |
| WO | WO-2019129112 | A1 | * | 7/2019 | .......... | H04L 67/146 |
| WO | WO-2020038560 | A1 | * | 2/2020 | ............ | H04W 48/18 |
| WO | WO-2021018418 | A1 | * | 2/2021 | .......... | H04L 41/147 |
| WO | WO-2021029512 | A1 | * | 2/2021 | ............ | H04W 68/00 |
| WO | WO-2021029513 | A1 | * | 2/2021 | ............ | H04W 80/10 |
| WO | WO-2021094025 | A1 | * | 5/2021 | ............ | H04W 76/12 |
| WO | WO-2021103016 | A1 | * | 6/2021 | .......... | H04L 45/655 |
| WO | WO-2021128225 | A1 | * | 7/2021 | ........... | H04W 36/00 |
| WO | WO-2021145608 | A1 | * | 7/2021 | ............ | H04L 67/12 |
| WO | WO-2021155938 | A1 | * | 8/2021 | ........... | H04W 40/36 |
| WO | WO-2022005170 | A1 | * | 1/2022 | ........... | H04W 40/02 |
| WO | WO-2022070042 | A1 | * | 4/2022 | ............ | H04L 67/51 |
| WO | WO-2022099484 | A1 | * | 5/2022 | ........... | H04W 68/00 |
| WO | WO-2022179218 | A1 | * | 9/2022 | ........... | H04W 36/00 |
| WO | WO-2024083190 | A1 | * | 4/2024 | ........... | H04W 76/10 |
| WO | WO-2025181517 | A1 | * | 9/2025 | ............ | H04L 1/08 |

OTHER PUBLICATIONS

Lenovo et al., "Discussion on KI#2 to support service continuity for edge application server relocation", 3GPP TSG SA2 Meeting #139E, S2-2003997, Jun. 1-12, 2020, Elbonia.

Huawei et al., "KI#2 Comparison of solutions for KI#2 and way forward", 3GPP TSG SA2 Meeting #140 e-meeting, S2-2005367, Aug. 19-Sep. 1, 2020, Elbonia.

Lenovo et al., "KI#2, Way forward on KI#2", 3GPP TSG SA2 Meeting #140E e-meeting, S2-2005836, Aug. 19-Sep. 2, 2020, Elbonia.

Ericsson, "KI#2, New sol: Service Continuity at EAS relocation with PSA coexistence in session break-out scenarios", 3GPP TSG SA/WG2 Meeting #140E S2-2005984, Aug. 19-Sep. 1, 2020.

Huawei et al., "Update solution #27: Reducing packet loss during EAS relocation", 3GPP TSG- WG SA2 Meeting #142E e-meeting, S2-2008636, Nov. 16-20, 2020, Elbonia.

Zte et al., "KI#2 conclusion on EAS relocation", 3GPP TSG-SA/WG2 Meeting #142e, S2-2009172, Nov. 16-20, 2020, Elbonia.

Zte et al., "KI#2 AF triggered EAS relocation", 3GPP TSG-WG SA2#145E Meeting emeeting, S2-2104453, May 17-28, 2021.

Ericsson, "AF Request for Simultaneous Connectivity over Source and Target PSA at Edge Relocation", 3GPP TSG-SA WG2 Meeting #146e, S2-2105517, Electronic meeting, Aug. 16, 2021-Aug. 27, 2021.

Ericsson, "AF Request for Simultaneous Connectivity over Source and Target PSA at Edge Relocation", 3GPP TSG-SA WG2 Meeting #146e, S2-2106742, Electronic meeting, Aug. 16, 2021-Aug. 27, 2021.

Ericsson, "Correction related to AF request for simultaneous connectivity over source and target PSA at Edge Relocation", 3GPP TSG-SA WG2 Meeting #148e, S2-2108410, Electronic meeting, Nov. 15, 2021-Nov. 22, 2021.

"Presentation of TR 23.748: Study on enhancement of support for Edge Computing in 5G Core network (5GC) to TSG SA for approval", TSG SA Meeting #SP-90E, SP-200970, Dec. 8-14, 2020, Electronic meeting.

3GPP, 3rd Generation Partnership Project; Technical Specification Group Services and System Aspects; Study on enhancement of support for Edge Computing in 5G Core network (5GC) (Release 17), 3GPP TR 23.748 V2.0.0 (Nov. 2020), Technical Report.

Extended European Search Report in Application No. 22926474.2 dated Jul. 23, 2025, 11 pages.

* cited by examiner

METHOD FOR EDGE COMPUTING

CROSS REFERENCE TO RELATED APPLICATIONS

This is a National Stage Application, filed under 35 U.S.C. 371, of International Patent Application No. PCT/CN2022/076869, filed Feb. 18, 2022, entitled "Method for Edge Computing", the disclosure of which is incorporated herein by reference in its entirety.

TECHNICAL FIELD

This document is directed generally to wireless communications, and in particular to $5^{th}$ generation (5G) communications.

BACKGROUND

In edge computing deployment, some traffic is offloaded to the Edge Application Server (EAS) in a local data network. When the UE (user equipment) moves, the existing data path may not be optimized any more. In particular, the EAS has to be relocated based on the current location and the network has to establish a new data path offloading traffic towards the new EAS.

SUMMARY

One aspect of the present disclosure relates to a wireless communication method. In an embodiment, the wireless communication method includes: transmitting, by an application function to a first application server (e.g., an edge application server or a non-edge/central application server), a tunnel ready notification to allow the first application server to transfer an application layer traffic to a second application server (e.g., an edge application server or a non-edge/central application server) via a tunnel between a first local user plane function for the first application server and a second local user plane function for the second application server.

Another aspect of the present disclosure relates to a wireless communication method. In an embodiment, the wireless communication method includes: transmitting, by a session management function to an application function, a message indicating that a tunnel between a first local user plane function for a first application server (e.g., an edge application server or a non-edge/central application server) and a second local user plane function for a second application server is established, to allow the first application server to transfer an application layer traffic to a second application server (e.g., an edge application server or a non-edge/central application server) via the tunnel.

Another aspect of the present disclosure relates to a wireless communication server. In an embodiment, the wireless communication server includes a communication unit and a processor. The processor is configured to: transmit, by an application function to a first application server (e.g., an edge application server or a non-edge/central application server), a tunnel ready notification to allow the first application server to transfer an application layer traffic to a second application server (e.g., an edge application server or a non-edge/central application server) via a tunnel between a first local user plane function for the first application server and a second local user plane function for the second application server.

Another aspect of the present disclosure relates to a wireless communication server. In an embodiment, the wireless communication server includes a communication unit and a processor. The processor is configured to: transmit, by a session management function to an application function, a message indicating that a tunnel between a first local user plane function for a first application server (e.g., an edge application server or a non-edge/central application server) and a second local user plane function for a second application server (e.g., an edge application server or a non-edge/central application server) is established, to allow the first application server to transfer an application layer traffic to a second application server via the tunnel.

Various embodiments may preferably implement the following features:

Preferably, the application layer traffic comprises an application context (e.g., an EAS context) of the first application server.

Preferably, the application function is configured to transmit relocation information to a session management function indicating that the first application server (e.g., a target application server or a target EAS) is relocated to the second application server.

Preferably, the application function is configured to transmit a tunnel create request to a session management function to create the tunnel.

Preferably, the tunnel create request comprises at least one of:

a traffic description, used by the first local user plane function for detecting the application layer traffic;

traffic routing information, used by the second local user plane function for routing the application layer traffic to the second application server; or target Data Network Access Information, DNAI, used by the session management function for selecting the second application server for establishing the tunnel.

Preferably, the application function is configured to transmit a tunnel delete request to a session management function to release the tunnel.

Preferably, the session management function is configured to receive relocation information from the application function indicating that a first application server (e.g., a target application server or a target EAS) is relocated to the second application server.

Preferably, the session management function is configured to receive a tunnel create request from the application function to create the tunnel.

Preferably, the session management function is configured to select the second local user plane function according to target DNAI.

Preferably, the session management function is configured to transmit a request for information of the tunnel to the second local user plane function.

Preferably, the session management function is configured to transmit traffic routing information to the second local user plane function.

Preferably, the session management function is configured to transmit information of the tunnel received from the second local user plane function to the first local user plane function.

Preferably, the session management function is configured to transmit traffic routing information to the first local user plane function.

Preferably, the session management function is configured to receive a tunnel delete request from a session management function to release the tunnel.

Preferably, the session management function is configured to transmit a request to delete information of the tunnel to the first local user plane function.

Preferably, the session management function is configured to transmit a request to delete information of the tunnel to the second local user plane function.

The present disclosure relates to a computer program product comprising a computer-readable program medium code stored thereupon, the code, when executed by a processor, causing the processor to implement a wireless communication method recited in any one of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
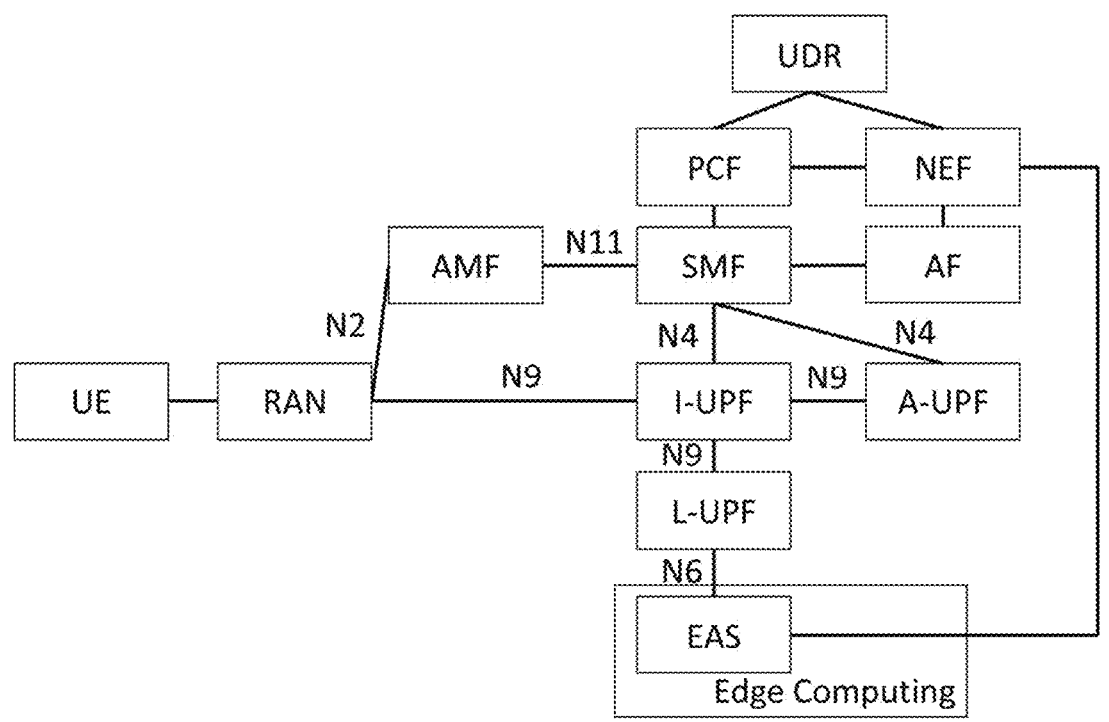
FIG. 1 shows the architecture of an exemplary 5G system according to an embodiment of the present disclosure.

FIG. 1 shows the architecture of an exemplary 5G system.

In detail, the architecture of FIG. 1 shows the following functions:

1) UE, User Equipment.

2) RAN, Radio Access Network.

3) AMF, Access and Mobility Management function. This function includes the following functionalities: Registration management, Connection management, Reachability management and Mobility Management. This function also performs the access authentication and access authorization. The AMF is the NAS security termination and relays the SM (session management) NAS (Non-access stratum) between UE and SMF, etc.

4) SMF, Session Management Function. This function includes the following functionalities: session establishment, modification and release, UE IP (Internet Protocol) address allocation and management (including optional authorization functions), selection and control of UP (user plane) function, downlink data notification, etc. The SMF controls the UPF (User plane function) via N4 association.

5) UPF, User plane function. This function includes the following functionalities: serving as an anchor point for intra-/inter-radio access technology (RAT) mobility, packet routing & forwarding, traffic usage reporting, QoS (Quality of Service) handling for the user plane, downlink packet buffering and downlink data notification triggering, etc. UPF may be deployed as I-UPF (Intermediate UPF) or A-UPF (Anchor UPF). A-UPF is the UPF terminating the N6 interface towards the data network. The I-UPF provides traffic forwarding between the RAN and A-UPF. The I-UPF may support ULCL (Uplink classifier: offloading uplink traffic based on target IP address) or BP (Branching point: offloading uplink traffic based on source IP address) to offload some traffic to L-UPF (Local UPF).

6) PCF, Policy Control Function. The PCF provides QoS policy rules to control plane functions to enforce the rules. The PCF(s) transform(s) the AF (application function) requests into policies that apply to PDU (Packet Data Unit) Sessions. The PCF provide the AF influenced Traffic Steering Enforcement Control in PCC (Policy and Charging Control) rules to SMF so the SMF can establish the data path to offload the traffic to local data network.

7) UDR, Unified Data Repository. The UDR can support the storage and retrieval of subscription data by the UDM, storage and retrieval of structured data for exposure, application data (such AF request information for multiple UEs, etc.). When application data is updated, the UDR may send a notification to the PCF if the PCF has subscribed the change. The PCF may also retrieve the application data from the UDR.

8) NEF, Network Exposure Function. The NEF stores/retrieves information as structured data using a standardized interface (e.g., Nudr) to the Unified Data Repository (UDR). The NEF provides a means for the Application Functions to securely provide information to a 3GPP (3rd Generation Partnership Project) network, e.g. the Application influence on traffic routing information. In that case, the NEF may authenticate and authorize and assist in throttling the Application Functions.

9) AF, Application Function. The AF interacts with the 3GPP Core Network in order to provide services, such as to support application influence on traffic routing. Based on operator deployment, Application Functions considered to be trusted by the operator can be allowed to interact directly with relevant Network Functions. Application Functions not allowed by the operator to access directly the Network Functions may use the external exposure framework via the NEF to interact with relevant Network Functions.

10) EAS, Edge Application Server. The EAS is an application server located in Edge environment to provide local service to the UE.

Figure 2:
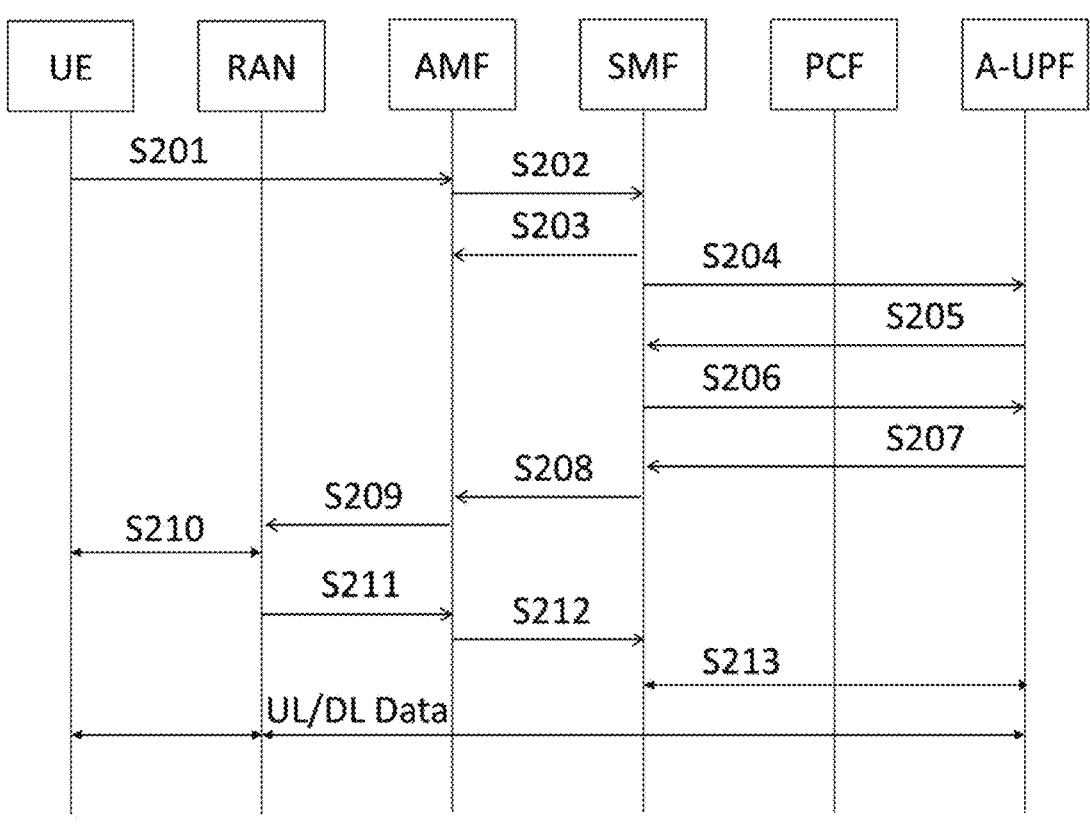
FIG. 2 shows the existing PDU Session establishment procedure according to an embodiment of the present disclosure.

FIG. 2 shows the existing PDU Session establishment procedure.

The procedure shown FIG. 2 comprises the following:

In S201, a PDU Session Establishment Request is send from UE to AMF comprising a NAS Message (including DNN (data network name), PDU Session ID (identifier), N1 SM container (including PDU Session Establishment Request)). In order to establish a new PDU Session, the UE generates a new PDU Session ID. The UE initiates the UE Requested PDU Session Establishment procedure by the transmission of a NAS message containing a PDU Session Establishment Request within the N1 SM container. The NAS message sent by the UE is encapsulated by the AN (access network) in a N2 message towards the AMF.

In S202, the AMF selects an SMF based on the requested DNN and other information. The AMF sends to the SMF a Nsmf_PDUSession_CreateSMContext Request (including SUPI (Subscription Permanent Identifier), DNN, PDU Session ID, AMF ID, N1 SM container (PDU Session Establishment Request). The SUPI (Subscription Permanent Identifier) uniquely identifies the UE subscription. The AMF ID is the UE's GUAMI (Globally Unique AMF ID) which uniquely identifies the AMF serving the UE. The AMF forwards the PDU Session ID together with the N1 SM container containing the PDU Session Establishment Request received from the UE.

In S203, if the SMF is able to process the PDU Session establishment request, the SMF creates an SM context and responds to the AMF by providing an SM Context Identifier in Nsmf_PDUSession_CreateSMContext Response.

In S204, the SMF determines that the PCC authorization is required and requests to establish an SM Policy Association with the PCF by invoking Npcf_SMPolicyControl_Create operation.

In S205, the PCF performs authorization based on UE subscription and local configuration. The PCF answers with a Npcf_SMPolicyControl_Create response. In its response, the PCF may provide policy information. The SMF enforces the policy information.

In S206, the SMF selects an A-UPF based on the DNN and other information. The SMF sends an N4 Session Establishment Request to the A-UPF and provides Packet detection, enforcement and reporting rules to be installed on the A-UPF for this PDU Session. If CN (core network) Tunnel Information is allocated by the SMF, the CN Tunnel Information is provided to A-UPF. The A-UPF acknowledges by sending an N4 Session Establishment Response. If CN Tunnel Information is allocated by the A-UPF, the CN Tunnel Information is provided to SMF in S207.

In S208, the SMF sends to AMF: Namf_Communication_N1N2MessageTransfer (including PDU Session ID, N2 SM information (including PDU Session ID, QFI(s), QoS Profile(s), N3 CN Tunnel Information), N1 SM container (including PDU Session Establishment Accept)). The N2 SM information carries information that the AMF may forward to the (R)AN ((Radio) Access Network) which includes the N3 CN Tunnel Information corresponds to the Core Network address of the N3 tunnel corresponding to the PDU Session, the QoS profiles and the corresponding QFI (QOS Flow Identifier) and the PDU Session ID. The N1 SM container contains the PDU Session Establishment Accept that the AMF may provide to the UE.

In S209, the AMF sends to the RAN: N2 PDU Session Request (N2 SM information, NAS message (including PDU Session ID, N1 SM container (including PDU Session Establishment Accept))). The AMF sends the NAS message containing PDU Session ID and PDU Session Establishment Accept targeted to the UE and the N2 SM information received from the SMF within the N2 PDU Session Request to the 5G-AN.

In S210, the RAN may issue AN specific signaling exchange with the UE that is related with the information received from SMF. For example, in case of a 3GPP RAN, an RRC Connection Reconfiguration may take place with the UE establishing the necessary RAN resources related to the QoS Rules for the PDU Session request. RAN forwards the NAS message (including PDU Session ID, N1 SM container (including PDU Session Establishment Accept)) to the UE. RAN also allocates AN N3 tunnel information for the PDU Session.

In S211, the RAN sends, to the AMF, N2 PDU Session Response (including PDU Session ID, Cause, N2 SM information (including PDU Session ID, AN Tunnel Info, List of accepted/rejected QFI(s))). The AN Tunnel Information corresponds to the Access Network address of the N3 tunnel corresponding to the PDU Session.

In S212, the AMF sends, to the SMF, Nsmf_PDUSession_UpdateSMContext Request (including N2 SM information). The AMF forwards the N2 SM information received from (R)AN to the SMF. If the list of rejected QFI(s) is included in N2 SM information, the SMF may release the rejected QFI(s) associated QoS profiles.

In S213, the SMF initiates an N4 Session Modification procedure with the PSA/UPF0. The SMF provides AN Tunnel Information to the PSA/UPF1 as well as the corresponding forwarding rules.

After this, the PDU Session is successfully established. The UE may obtain IP addresses via the user plane of established PDU Session. UE starts to use the established user plane for uplink and downlink data transmission.

Figure 3:
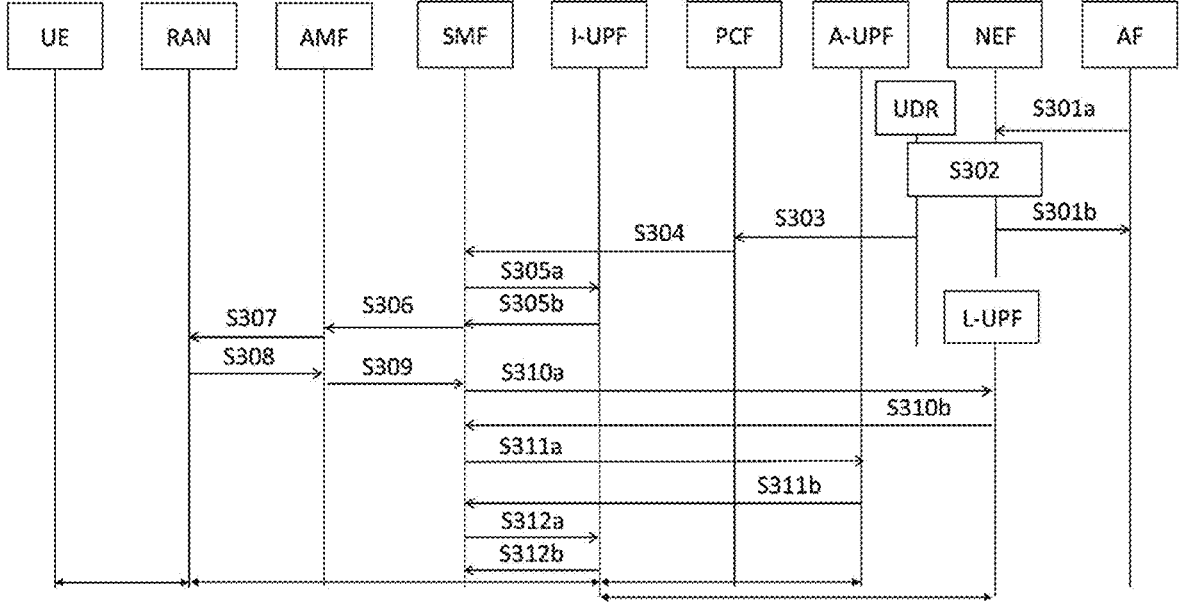
FIG. 3 shows an example of how the AF can request traffic offloading according to an embodiment of the present disclosure.

FIG. 3 shows an example of how the AF can request traffic offloading.

In S301a, to create a new request, the AF invokes an Nnef_TrafficInfluence_Create service operation. The content of this service operation is an AF request. The request contains also an AF Transaction Id. The AF request includes the following information:

1) Information to identify the traffic. The traffic can be identified in the AF request by: either a DNN and possibly slicing information (S-NSSAI) or an AF-Service-Identifier; when the AF provides an AF-Service-Identifier i.e. an identifier of the service on behalf of which the AF is issuing the request, the NEF maps this identifier into a target DNN and slicing information (S-NSSAI); an application identifier or traffic filtering information (e.g. 5 Tuple). The application identifier refers to an application handling UP traffic and is used by the UPF to detect the traffic of the application;

2) Information about the N6 traffic routing requirements for traffic identified as defined in 1). This includes: information about the N6 traffic routing requirements that is provided per DNAI (Data Network Access Information): for each DNAI, the N6 traffic routing requirements may contain a routing profile ID and/or N6 traffic routing information;

3) Potential locations of applications towards which the traffic routing should apply. The potential location of application is expressed as a list of DNAI(s). The DNAI(s) may be used for UPF (re) selection;

4) Information on the UE(s). This may correspond to: individual UEs identified using GPSI, or an IP address/Prefix or a MAC address; groups of UEs identified by an External Group Identifier when the AF interacts via the NEF, or Internal-Group Identifier when the AF interacts directly with the PCF; any UE accessing the combination of DNN, S-NSSAI and DNAI(s);

5) Information on AF subscription to corresponding SMF events. The AF may request to be subscribed to change of UP path associated with traffic identified in the bullet 1) above. The AF request contains: a type of subscription (subscription for Early and/or Late notifications). The AF subscription can be for Early notifications and/or Late notifications. In the case of a subscription for Early notifications, the SMF sends the notifications before the (new) UP path is configured. In the case of a subscription for Late notifications, the SMF sends the notification after the (new) UP path has been configured.

In S301b, the NEF responds to the AF.

Furthermore, in S302, in the case of the AF invoking the Nnef_TrafficInfluence_Create service operation, the NEF stores the AF request information in the UDR (e.g., Data Set=Application Data; Data Subset=AF traffic influence request information, Data Key=AF Transaction Internal ID, S-NSSAI and DNN and/or Internal Group Identifier or SUPI).

In S303, the PCF(s) that has/have subscribed to modifications of AF requests (e.g., Data Set=Application Data; Data Subset=AF traffic influence request information, Data Key=S-NSSAI and DNN and/or Internal Group Identifier or SUPI) receive(s) an Nudr_DM_Notify notification of data change from the UDR.

In S304, the PCF determines if existing PDU Sessions are potentially impacted by the AF request. For each of these PDU Sessions, the PCF updates the SMF with corresponding new PCC rule(s) by invoking Npcf_SMPolicyControl_UpdateNotify service operation. The PCF sends a message to the SMF with information to identify the PDU Session, information to identify the traffic which needs to be offloaded, and information (e.g., DNAI) to identify where the traffic should be offloaded to. If the AF request includes a notification reporting request for a UP path change, the PCF includes in the PCC rule(s) the information required for reporting the event, including the Notification Target Address pointing to the NEF or AF and the Notification Correlation ID containing the AF Transaction Internal ID.

The SMF performs UPF Selection to select L-UPF (local UPF) based on the requested DNAI and other information. The L-UPF is used to offload traffic and connect to EAS1 in local data network. The SMF may further select I-UPF (Intermediate UPF) which can perform ULCL or BP to offload traffic to L-UPF. The L-UPF is considered to be closer to the UE so traffic transmission efficiency can be achieved. In S305a, the SMF sends an N4 Session Establishment Request to the I-UPF. If CN Tunnel Information is allocated by the I-UPF, the CN Tunnel Information is provided to the SMF in S305b in the response message. In this procedure, both N3 CN Tunnel Information and N9 CN Tunnel information are allocated. In this procedure, the SMF also provides the I-UPF the traffic filters which are subject to offloading. The I-UPF uses the traffic filters to identify the packets and forwards the packets towards local data network.

In S306, the SMF sends, to the AMF, Namf_Communication_N1N2MessageTransfer (including PDU Session ID, N2 SM information (including PDU Session ID, N3 CN Tunnel Information of I-UPF). The N2 SM information carries information that the AMF may forward to the RAN which includes the N3 CN Tunnel Information of the I-UPF.

In S307, the AMF sends, to the RAN, N2 PDU Session Request (including N2 SM information). The AMF sends the N2 SM information received from the A-SMF within the N2 PDU Session Request to the 5G-AN.

In S308, the RAN sends, to the AMF, a N2 PDU Session Response (PDU Session ID, Cause).

In S309, the AMF sends, to the SMF, Nsmf_PDUSession_UpdateSMContext Request. The AMF forwards the N2 SM information received from (R)AN to the A-SMF.

In S310a and S310b, the SMF initiates an N4 Session Establishment procedure with the PSA (PDU session anchor)/L-UPF. The SMF provides N9 Tunnel Information of I-UPF to PSA/L-UPF.

In S311a and S311b, the SMF initiates an N4 Session Modification procedure with the A-UPF. The SMF provides N9 CN Tunnel Information of I-UPF to the A-UPF.

In S312a and S312b, the SMF initiates an N4 Session Modification procedure with the I-UPF. The SMF provides N9 Tunnel Information of A-UPF to I-UPF.

After this, the I-UPF performs the UL (user plane)/CL (control plane) or BP (Branching Point) to offload traffic towards L-UPF. The L-UPF further transmits the offloading traffic via N6 to application server in EAS in local data network.

Figure 4:
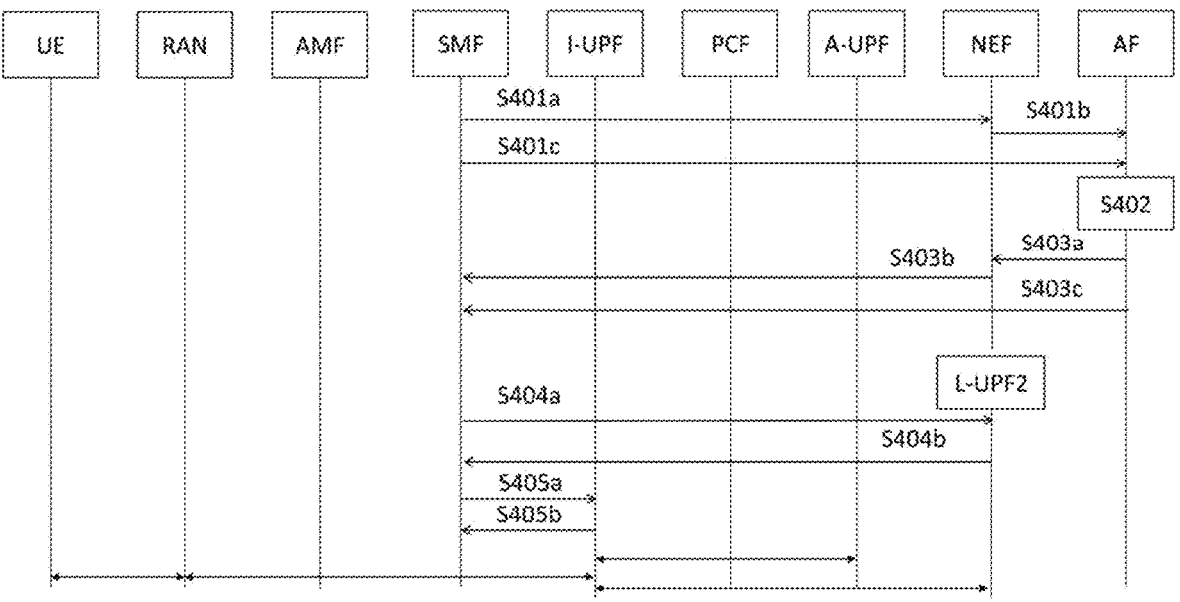
FIG. 4 shows an example of how the SMF notifies the AF when the subscribed event is met according to an embodiment of the present disclosure.

FIG. 4 shows an example of how the SMF notifies the AF when the subscribed event is met.

In S401a, a condition for an AF notification has been met when, for example, the DNAI has changed during UE mobility. The SMF sends the notification to the AF that is subscribed for SMF notifications. The notification may include the target DNAI.

In S401b, when the NEF receives Nsmf_EventExposure_Notify, the NEF performs information mapping (e.g. mapping AF Transaction Internal ID provided in Notification Correlation ID to AF Transaction ID, mapping SUPI (Subscription Permanent Identifier) to GPSI (Generic Public Subscription Identifier), etc.) as applicable and triggers the appropriate Nnef_TrafficInfluence_Notify message. In this case, S401c is not applicable.

In S401c, if direct notification is requested by the AF, the SMF notifies the AF by invoking Nsmf_EventExposure_Notify service operation.

In S402, based on the target DNAI in the notification, the AF performs EAS relocation. The EAS2 is now serving the current UE.

In S403a, the AF replies to Nnef_TrafficInfluence_Notify by invoking Nnef_TrafficInfluence_AppRelocationInformation service operation either immediately or after any required EAS relocation in the target DNAI is completed. The AF may reply in negative e.g. if the AF determines that the application relocation cannot be completed successfully and/or on time.

In S403b, when the NEF receives Nnef_TrafficInfluence_AppRelocationInfo, the NEF triggers the appropriate Nsmf_EventExposure_AppRelocationInformation message to SMF. In this case, S403c is not applicable.

In S403c, the AF replies to Nsmf_EventExposure_Notify by invoking Nsmf_EventExposure_AppRelocationInformation service operation either immediately or after any required application relocation in the target DNAI is completed. AF may reply in negative e.g. if the AF determines that the application relocation cannot be completed successfully on time.

In S404a and S404b, for Early notification, upon receiving the response from the AF or NEF, the SMF reselect the L-UPF2 according to the target DNAI. The L-UPF2 is used to offload traffic and connect to the EAS2 in local data network. The SMF sends an N4 Session Establishment Request to L-UPF2. The SMF provides the N9 Tunnel Information of I-UPF to L-UPF2.

In S405a and S405b, the SMF initiates an N4 Session Modification procedure with the I-UPF. The SMF provides N9 Tunnel Information of PSA/UPF to I-UPF. The SMF updates the forwarding rules in I-UPF acting as UL CL/Branching Point to enable the uplink traffic offloading to L-UPF2.

In the above described example, there is an issue in S402. If application layer service continuity needs to be supported, the EAS1 may need to transfer the EAS context (including the application layer internal context) to EAS2. However, when there is no direct connection between EAS1 and EAS2, it is unclear how to transfer the EAS context to support service continuity.

Figure 5:
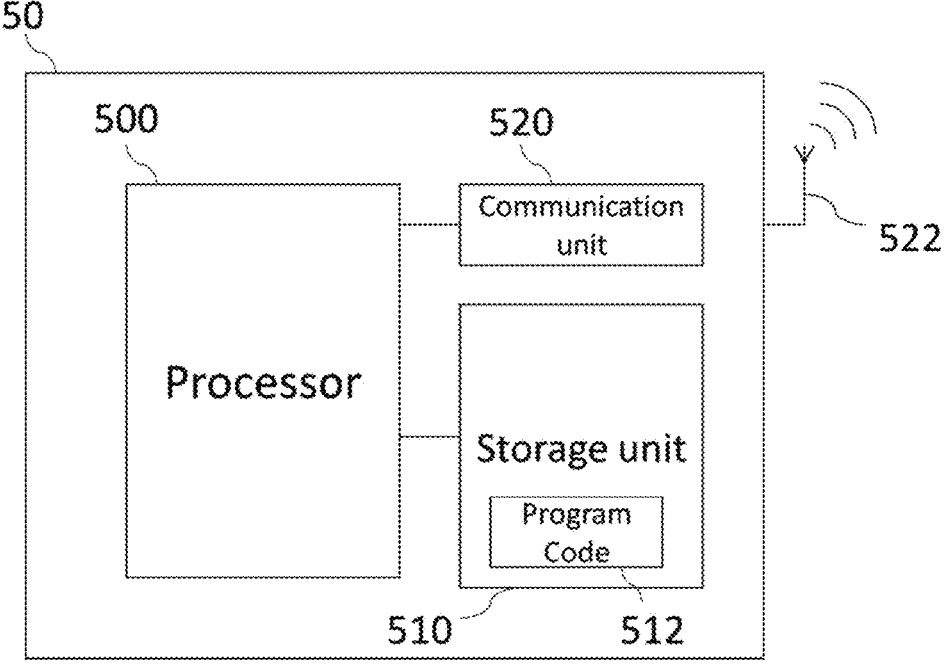
FIG. 5 shows a schematic diagram of a wireless terminal according to an embodiment of the present disclosure.

FIG. 5 relates to a schematic diagram of a wireless terminal 50 according to an embodiment of the present disclosure. The wireless terminal 50 may be a user equipment (UE), a mobile phone, a laptop, a tablet computer, an electronic book or a portable computer system and is not limited herein. The wireless terminal 50 may include a processor 500 such as a microprocessor or Application Specific Integrated Circuit (ASIC), a storage unit 510 and a communication unit 520. The storage unit 510 may be any data storage device that stores a program code 512, which is accessed and executed by the processor 500. Embodiments of the storage unit 512 include but are not limited to a subscriber identity module (SIM), read-only memory (ROM), flash memory, random-access memory (RAM), hard-disk, and optical data storage device. The communication unit 520 may a transceiver and is used to transmit and receive signals (e.g. messages or packets) according to processing results of the processor 500. In an embodiment, the communication unit 520 transmits and receives the signals via at least one antenna 422 shown in FIG. 5.

In an embodiment, the storage unit 510 and the program code 512 may be omitted and the processor 500 may include a storage unit with stored program code.

The processor 500 may implement any one of the steps in exemplified embodiments on the wireless terminal 50, e.g., by executing the program code 512.

The communication unit 520 may be a transceiver. The communication unit 520 may as an alternative or in addition be combining a transmitting unit and a receiving unit configured to transmit and to receive, respectively, signals to and from a wireless communication server.

Figure 6:
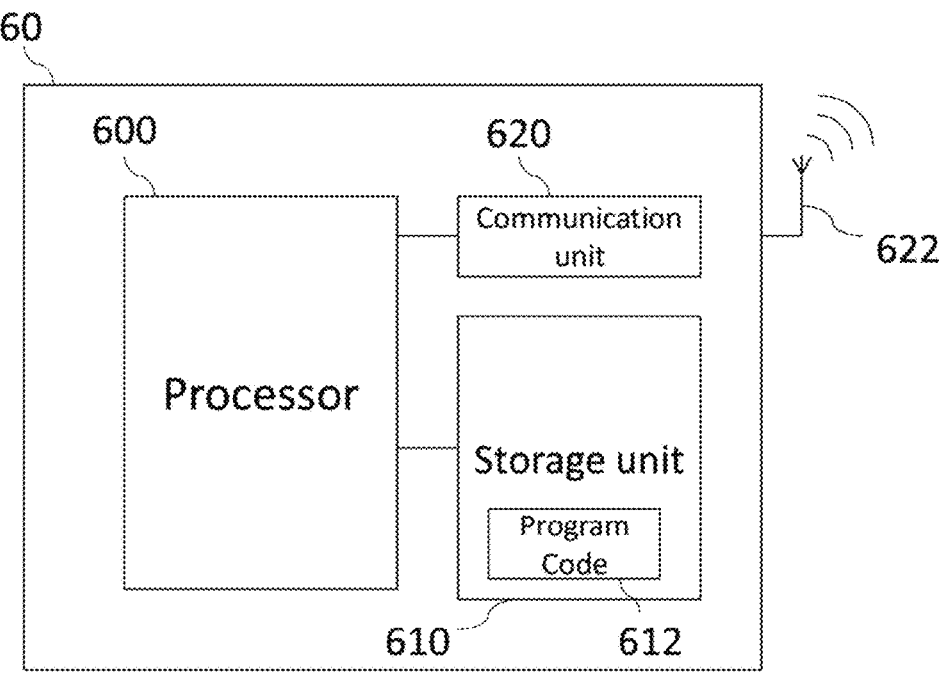
FIG. 6 shows a schematic diagram of a wireless communication server according to an embodiment of the present disclosure.

FIG. 6 relates to a schematic diagram of a wireless communication server 60 according to an embodiment of the present disclosure. The wireless communication server 60 may be a satellite, a base station (BS), an application server (e.g., an EAS or a non-edge central application server), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU) a data network, a core network or a Radio Network Controller (RNC), and is not limited herein. In addition, wireless communication server 60 may comprise (perform)

at least one network function such as an access and mobility management function (AMF), a session management function (SMF), a user place function (UPF), a policy control function (PCF), an application function (AF), etc. The wireless communication server 60 may include a processor 600 such as a microprocessor or ASIC, a storage unit 610 and a communication unit 620. The storage unit 610 may be any data storage device that stores a program code 612, which is accessed and executed by the processor 600. Examples of the storage unit 612 include but are not limited to a SIM, ROM, flash memory, RAM, hard-disk, and optical data storage device. The communication unit 620 may be a transceiver and is used to transmit and receive signals (e.g. messages or packets) according to processing results of the processor 600. In an example, the communication unit 620 transmits and receives the signals via at least one antenna 622 shown in FIG. 6.

In an embodiment, the storage unit 610 and the program code 612 may be omitted. The processor 500 may include a storage unit with stored program code.

The processor 600 may implement any steps described in exemplified embodiments on the wireless communication server 60, e.g., via executing the program code 612.

The communication unit 620 may be a transceiver. The communication unit 620 may as an alternative or in addition be combining a transmitting unit and a receiving unit configured to transmit and to receive, respectively, signals to and from a wireless terminal (e.g. a user equipment) or another wireless communication server.

Figure 7:
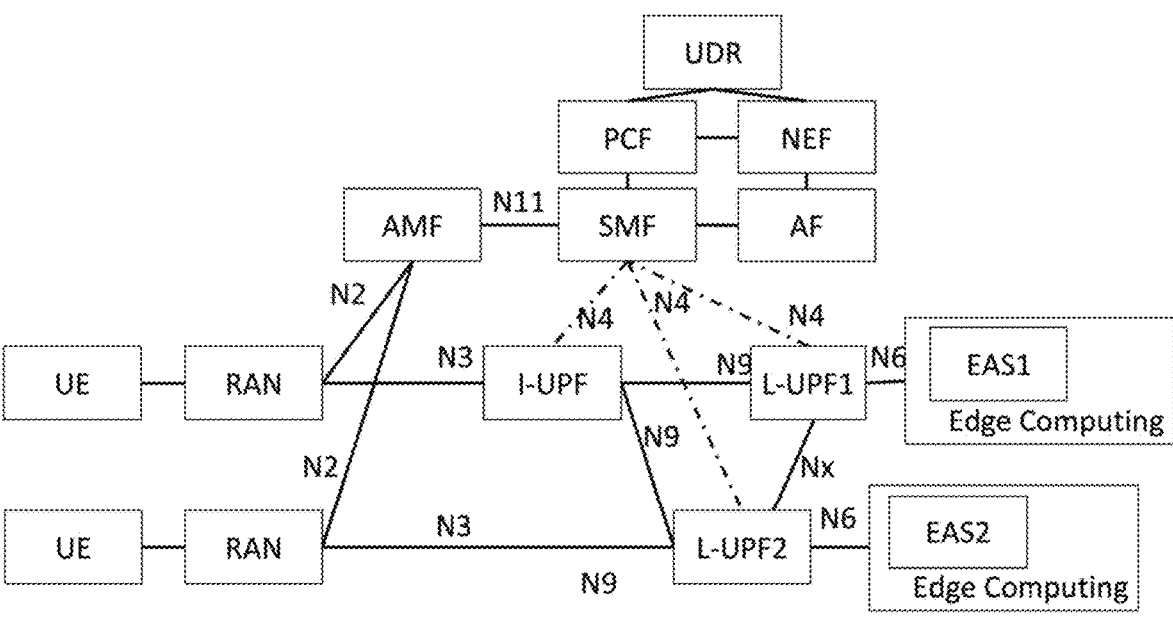
FIG. 7 shows the architecture of a 5G system according to an embodiment of the present disclosure.

Referring to FIG. 7, in an embodiment, a new Nx tunnel is established between the L-UPF1 and L-UPF2. Accordingly, the EAS1 can use this Nx tunnel to transfer the EAS context. When there is no direct connection between the L-UPF1 and L-UPF2, the Nx tunnel may be established via a different UPF, such as I-UPF. The Nx tunnel may be specific to one EAS, or not specific to one EAS, i.e. different EAS(es) may re-use the same Nx tunnel to transfer EAS context.

Figure 8:
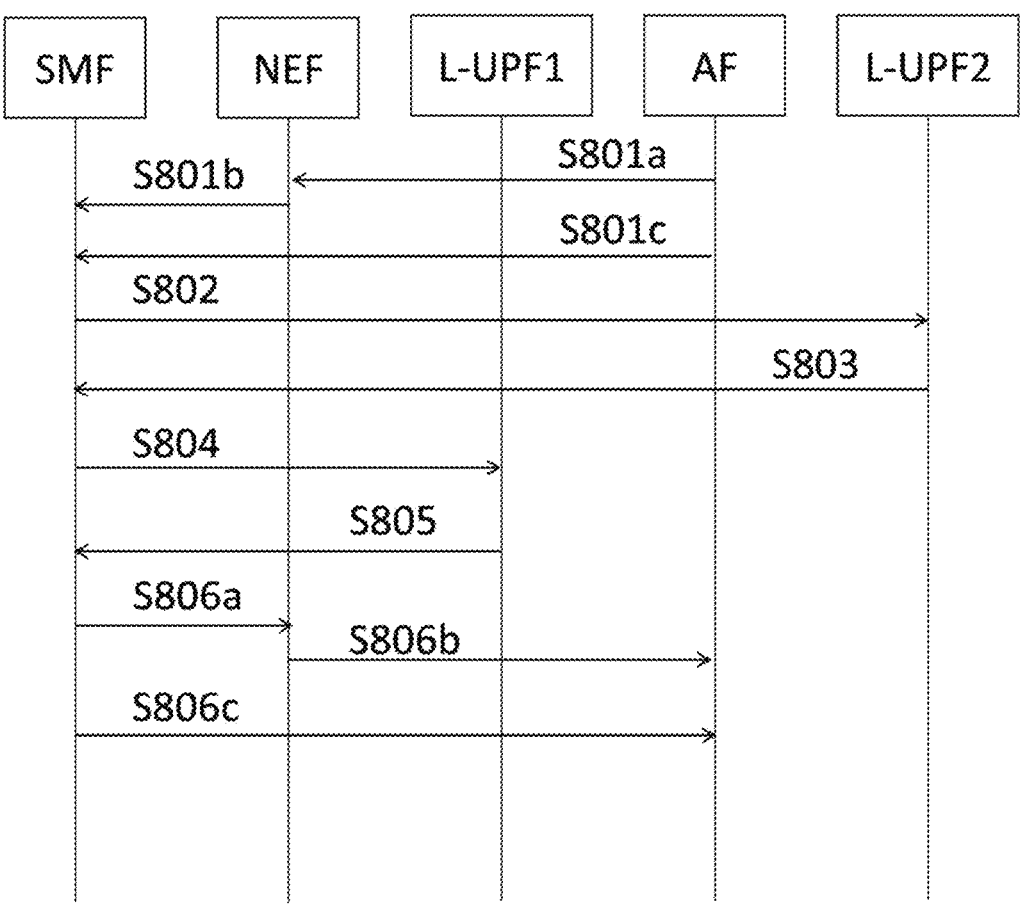
FIG. 8 shows how the AF can request the SMF to establish the Nx tunnel between two L-UPFs according to an embodiment of the present disclosure.

FIG. 8 shows how the AF requests the SMF to establish the Nx tunnel between two L-UPFs according to an embodiment of the present disclosure.

In S801a to S801c, the AF may request the SMF to create a tunnel between two UPFs. If the AF is a third party AF, in S801a, the AF invokes the Nnef_EventExposure_CreateTunnel service operation, and then, in S801b, the NEF invokes Nsmf_EventExposure_CreateTunnel service operation. Otherwise the AF invokes, in S801c, Nsmf_EventExposure_CreateTunnel service operation directly. The AF or NEF selects the SMF based on the DNAI(s) of the L-UPF1 and L-UPF2, by local configuration or querying the NRF (Network Repository Function). When the PDU session has been established, the AF or NEF may select the SMF serving the PDU session. The content of this service operation includes the following information:

Information to identify the application traffic to be transferred via the Nx tunnel between L-UPF1 and L-UPF2. The traffic can be identified in the AF request by an application identifier or traffic filtering information (e.g. 5 Tuple). The application identifier refers to a set of local detection rules and the UPF uses this local rules identified by the application identifier to detect the traffic of the application.

Information about the N6 traffic routing requirements in the L-UPF2 for application traffic. The N6 traffic routing requirements may contain a routing profile ID and/or N6 traffic routing information.

The source DNAI of the L-UPF1 and target DNAI of the L-UPF2.

In S802, if the L-UPF2 has not been selected, the SMF selects the L-UPF2 based on the target DNAI and sends an N4 Session Create procedure to L-UPF2. Otherwise, the SMF initiates an N4 Session Modification towards the L-UPF2. The SMF sets an indication to request the L-UPF2 to allocate Nx tunnel information (e.g. GTP-U (GPRS (General Packet Radio Service) Tunneling Protocol User Plane) Tunnel Endpoint ID) and provides the N6 traffic routing information to the L-UPF2 so the L-UPF2 can route the application layer traffic towards the EAS2.

In S803, the L-UPF2 allocates the Nx tunnel information and then send them back to the SMF.

In S804, if the L-UPF1 has not been selected, the SMF selects the L-UPF1 based on the source DNAI and sends the N4 Session Create procedure to the L-UPF1. Otherwise, the SMF initiates an N4 Session Modification to the L-UPF1. The SMF provides the Nx tunnel information of the L-UPF2 to L-UPF1. The SMF also provides the application layer traffic description to L-UPF1 so the L-UPF1 can detect the application layer traffic and transfer the traffic over the Nx tunnel.

In S805, the L-UPF1 returns a response to the SMF. After this, the Nx tunnel from the L-UPF1 to L-UPF2 is established.

After the Nx tunnel has been successfully established, or when there is already an Nx tunnel between the L-UPF1 and L-UPF2 and can be reused for the application layer traffic, the SMF sends, in S806c, an Nsmf_EventExposure_CreateTunnel Response to the AF. This message includes a cause value that the Nx tunnel is established successfully. If the NEF is used, the SMF sends the response via the NEF (S806a and S806b). The response message includes information to uniquely identify the Nx tunnel in SMF.

Figure 9:
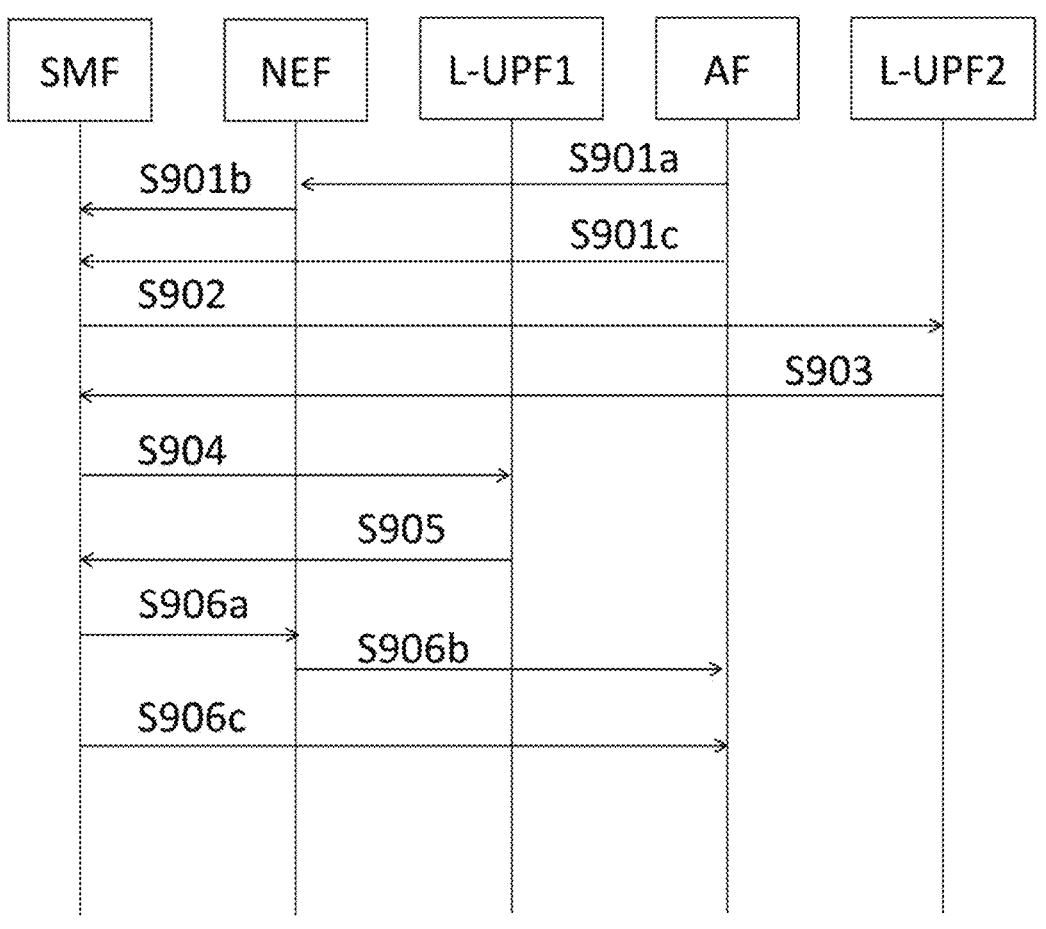
FIG. 9 shows how to establish the Nx tunnel between the L-UPF1 and I-UPF2 to transfer the EAS context according to an embodiment of the present disclosure.

FIG. 9 illustrates a scenario where the AF can request the SMF to delete the Nx tunnel according to an embodiment of the present disclosure.

In S901a to S901c, the AF may request the SMF to delete the tunnel used for application layer traffic delivery between two UPFs. If the AF is a third party AF, the AF invokes, in S901a, the Nnef_EventExposure_DeleteTunnel service operation, and then the NEF invokes, in S901b, Nsmf_E-ventExposure_DeleteTunnel service operation. Otherwise, the AF invokes, in S901c Nsmf_EventExposure_DeleteTunnel service operation directly. The content of this service operation (AF request) includes information to uniquely identify the Nx tunnel in SMF.

In S902, the SMF initiates an N4 Session Modification towards the L-UPF2 to remove the Nx tunnel information.

In S903, the L-UPF2 sends response to SMF.

In S904, the SMF sends an N4 Session Modification to L-UPF1 to remove the Nx tunnel information.

In S905, the L-UPF1 returns a response to SMF. After this, the Nx tunnel from the L-UPF1 to L-UPF2 is released.

After the Nx tunnel has been successfully released, the SMF sends, in S906c, Nsmf_EventExposure_DeleteTunnel Response to the AF. This message includes a cause value that the Nx tunnel is released successfully. If the NEF is used, the SMF sends the response via the NEF (S906a and S906b).

Figure 10:
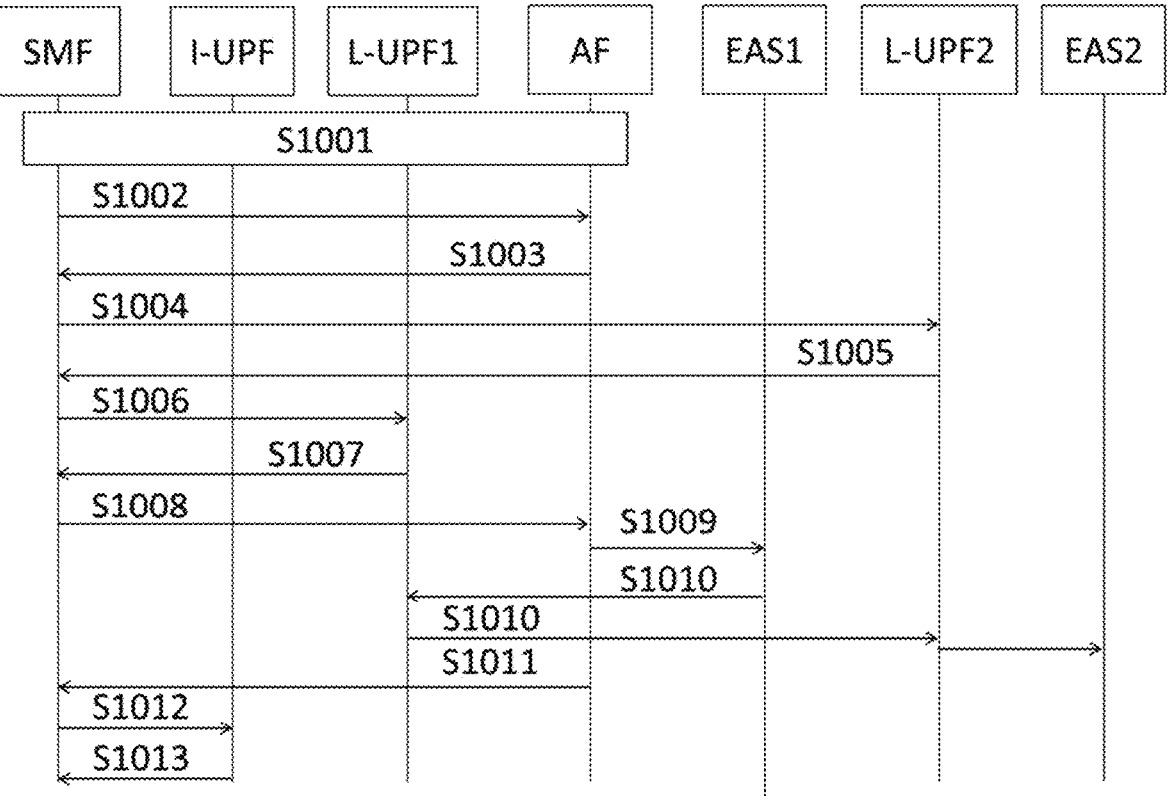
FIG. 10 illustrates how to establish the Nx tunnel between the L-UPF1 and I-UPF2 to transfer the EAS context according to an embodiment of the present disclosure.

FIG. 10 illustrates how to establish the Nx tunnel between the L-UPF1 and L-UPF2 to transfer the EAS context according to an embodiment of the present disclosure.

In S1001, the AF initiates a Traffic Influence procedure as shown in FIG. 3 above. After this, the I-UPF performs the UL/CL or BP to offload traffic towards the L-UPF1. The L-UPF1 further transmits the offloading traffic via N6 to the application server in EAS1 in a local data network.

In S1002, during the UE mobility, the SMF detects that there is a need to change the DNAI, the SMF invokes notification procedures as described above to notify that the DNAI is to be changed. The AF then determines to trigger EAS relocation.

In S1003, if the AF detects that there is no direct connection between EAS1 and EAS2, it sends an Nsmf_EventExposure_Create Tunnel Request to the SMF to establish an Nx tunnel which can be used for EAS context transfer. This message may include the following information:

1) The EAS context transfer traffic description: this information is used by the L-UPF1 to detect the EAS context transfer traffic which may be transferred over the Nx tunnel towards the L-UPF2.

2) The N6 traffic routing information: this information is used by the L-UPF2 to route the EAS context transfer traffic over interface N6 to EAS2.

3) The target DNAI: this information is included if the SMF does not provide the target DNAI and may be used by the SMF to reselect a different L-UPF2 to establish the Nx tunnel.

In S1004, if the L-UPF2 has not been selected, the SMF selects the L-UPF2 based on the target DNAI and sends the N4 Session Create procedure to the L-UPF2. Otherwise, the SMF initiates an N4 Session Modification towards the L-UPF2. The SMF sets an indication to request the L-UPF2 to allocate Nx tunnel information (e.g. GTP-U Tunnel Endpoint ID). The SMF also requests the L-UPF2 to allocate N9 tunnel information and provides the traffic routing information to L-UPF2, so that the L-UPF2 can route the EAS context transfer traffic over N6 towards the EAS2.

In S1005, the L-UPF2 allocates the Nx tunnel information and N9 tunnel information and then sends them back to the SMF.

In S1006, the SMF initiates an N4 Session Modification procedure towards the L-UPF1 to provide the Nx tunnel information of the L-UPF2. The SMF also provides the EAS context traffic description to L-UPF1, so that the L-UPF1 can route the EAS context transfer traffic over the Nx tunnel.

In S1007, the L-UPF1 returns a response to the SMF. After this, the Nx tunnel from the L-UPF1 to L-UPF2 is established.

In S1008, after the Nx tunnel has been successfully established, or when there is already an Nx tunnel between the L-UPF1 and L-UPF2, the SMF sends Nsmf_EventExposure_CreateTunnel Response to the AF. This message includes a cause value indicating that the Nx tunnel is established successfully.

In S1009, the AF sends an Nx tunnel ready notification towards the EAS1.

In 1010, the EAS1 then starts the EAS context transfer procedure. The EAS1 sends EAS context towards the L-UPF1. The L-UPF1 detects the EAS context traffic and forwards it over the Nx tunnel towards the L-UPF2. The L-UPF2 then forward the EAS context traffic over N6 towards the EAS2 based on the N6 traffic routing information.

In S1011, after the EAS relocation is completed, the AF sends the Nsmf_EventExposure_AppRelocation Information to the the SMF or Nnef_TrafficInfluence_AppRelocationInformation to the NEF and then the NEF sends Nsmf_EventExposure_AppRelocationInformation to the SMF. This message includes a cause value indicating that the EAS relocation is completed and the target EAS is ready to receive the uplink data.

In S1012, the SMF initiates an N4 Session Modification procedure with the I-UPF. The SMF provides N9 Tunnel Information of the L-UPF2 to the I-UPF. The SMF updates the forwarding rules in I-UPF acting as Branching Point to enable the uplink traffic offloading to the L-UPF2.

In S1013, the I-UPF sends a response to the SMF.

Optionally, in S1003, the AF may provide another application layer traffic description to the SMF to identify the application layer traffic. In this case, the Nx tunnel can be used by the EAS to deliver the application layer traffic identified by the traffic description towards the another EAS or AS (application server).

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of the claims. Thus, the disclosure is not intended to be limited to the implementations shown herein, but is to be accorded the widest scope consistent with the novel features and principles disclosed herein, as recited in the claims below.

What is claimed:

1. A wireless communication method, applied to an application function in a wireless communication system, wherein the system further comprises a session management function, a first local user plane function, a second local user plane function, a first application server, a second application server, and a user equipment, wherein the method comprises:

receiving, by the application function from the session management function, a message indicating that a tunnel between the first local user plane function for the first application server and the second local user plane function for the second application server is established; and transmitting, by the application function to the first application server, a tunnel ready notification to allow the first application server to transfer an application layer traffic to the second application server via the tunnel;

wherein the first local user plane function is connected to the first application server via a first N6 interface, and the second local user plane function is connected to the second application server via a second N6 interface;

wherein the application function is configured to transmit a tunnel creation request to the session management function to create the tunnel, wherein the tunnel refers to an Nx tunnel established by the session management function through an N4 session modification procedure towards the first local user plane function and the second local user plane function;

wherein the tunnel creation request comprises a traffic description that is used by the first local user plane function for detecting the application layer traffic; and wherein the first application server and the second application server are edge application servers and provide local service to the user equipment.

2. The wireless communication method of claim 1, wherein the application layer traffic comprises an application context of the first application server.

3. The wireless communication method of claim 1, wherein the application function is configured to transmit relocation information to the session management function indicating that the first application server is relocated to the second application server.

4. The wireless communication method of claim 1, wherein the tunnel create request further comprises at least one of:

a traffic description, used by the first local user plane function for detecting the application layer traffic;

traffic routing information, used by the second local user plane function for routing the application layer traffic to the second application server; or target Data Network Access Information (DNAI) used by the session management function for selecting the second application server for establishing the tunnel.

5. The wireless communication method of claim 1, wherein the application function is configured to transmit a tunnel delete request to the session management function to release the tunnel.

6. A wireless communication server, comprising:

a communication unit; and a processor configured to:

receive, from a session management function, a message indicating that a tunnel between a first local user plane function for a first application server and a second local user plane function for a second application server is established; and transmit, to the first application server, a tunnel ready notification to allow the first application server to transfer an application layer traffic to the second application server via the tunnel;

wherein the first local user plane function is connected to the first application server via a first N6 interface, and the second local user plane function is connected to the second application server via a second N6 interface;

wherein the processor is configured to transmit a tunnel creation request to the session management function to create the tunnel, wherein the tunnel refers to an Nx tunnel established by the session management function through an N4 session modification procedure towards the first local user plane function and the second local user plane function;

wherein the tunnel creation request comprises a traffic description that is used by the first local user plane function for detecting the application layer traffic; and wherein the first application server and the second application server are edge application servers and provide local service to a user equipment.

7. The wireless communication server of claim 6, wherein the application layer traffic comprises an application context of the first application server.

8. The wireless communication server of claim 6, wherein the processor is configured to transmit relocation information to the session management function indicating that the first application server is relocated to the second application server.

9. The wireless communication server of claim 6, wherein the tunnel create request further comprises at least one of:

traffic routing information, used by the second local user plane function for routing the application layer traffic to the second application server; or target Data Network Access Information (DNAI) used by the session management function for selecting the second application server for establishing the tunnel.

10. The wireless communication server of claim 6, wherein the processor is configured to transmit a tunnel delete request to the session management function to release the tunnel.

11. A non-transitory computer-readable storage medium, which is configured to store a computer program, wherein the computer program, when executed by a processor, causes the processor to perform a wireless communication method, where the method comprises:

controlling an application function to receive a message from a session management function, the message indicating that a tunnel between a first local user plane function for a first application server and a second local user plane function for a second application server is established; and controlling the application function to transmit a tunnel ready notification to the first application server, to allow the first application server to transfer an application layer traffic to the second application server via the tunnel;

wherein the first local user plane function is connected to the first application server via a first N6 interface, and the second local user plane function is connected to the second application server via a second N6 interface;

wherein the application function is configured to transmit a tunnel creation request to the session management function to create the tunnel, wherein the tunnel refers to an Nx tunnel established by the session management function through an N4 session modification procedure towards the first local user plane function and the second local user plane function;

wherein the tunnel creation request comprises a traffic description that is used by the first local user plane function for detecting the application layer traffic; and wherein the first application server and the second application server are edge application servers and provide local service to a user equipment.

12. The storage medium of claim 11, wherein the application layer traffic comprises an application context of the first application server.

13. The storage medium of claim 11, wherein the application function is configured to transmit relocation information to the session management function indicating that the first application server is relocated to the second application server.

14. The storage medium of claim 11, wherein the tunnel create request further comprises at least one of:

traffic routing information, used by the second local user plane function for routing the application layer traffic to the second application server; or target Data Network Access Information (DNAI) used by the session management function for selecting the second application server for establishing the tunnel.

15. The storage medium of claim 11, wherein the application function is configured to transmit a tunnel delete request to the session management function to release the tunnel.

* * * * *